(12) United States Patent
Filko et al.

(10) Patent No.: US 11,812,802 B2
(45) Date of Patent: Nov. 14, 2023

(54) PROTECTIVE SHIELDS AND PROTECTIVE SHIELD ASSEMBLIES FOR INDIVIDUAL RESPIRATORS AND FACE MASKS

(71) Applicants: Jeremy S. Filko, Vienna, VA (US); Andrew W. Lane, Baldwin, MD (US); Carlton E. Colter, Falls Church, VA (US); Luke S. Vosburgh, Daniel Island, SC (US)

(72) Inventors: Jeremy S. Filko, Vienna, VA (US); Andrew W. Lane, Baldwin, MD (US); Carlton E. Colter, Falls Church, VA (US); Luke S. Vosburgh, Daniel Island, SC (US)

( * ) Notice: Subject to any disclaimer, the term of this patent is extended or adjusted under 35 U.S.C. 154(b) by 169 days.

(21) Appl. No.: 17/227,477

(22) Filed: Apr. 12, 2021

(65) Prior Publication Data
US 2021/0321685 A1    Oct. 21, 2021

Related U.S. Application Data

(60) Provisional application No. 63/010,225, filed on Apr. 15, 2020.

(51) Int. Cl.
*A41D 13/11* (2006.01)
*A41D 13/05* (2006.01)

(52) U.S. Cl.
CPC .......... *A41D 13/0556* (2013.01); *A41D 13/11* (2013.01)

(58) Field of Classification Search
CPC . A41D 13/1115; A41D 13/11; A41D 13/1107; A62B 23/025; A61F 5/05825
See application file for complete search history.

(56) References Cited

U.S. PATENT DOCUMENTS 4,630,604 A * 12/1986 Montesi ............. A41D 13/1146
128/206.17

* cited by examiner

*Primary Examiner* — Keri J Nelson
(74) *Attorney, Agent, or Firm* — Carter, DeLuca & Farrell LLP

(57) ABSTRACT

A protective shield configured to be disposed over an N95 respirator worn by a user includes an inner shield and an outer shield. The inner shield defines a body, a flap, and a living hinge connecting the body and the flap with one another to enable the flap to fold under a user's chin while the body extends across a user's face. The body includes a center portion and first and second wings extending laterally outwardly in opposite directions from the center portion. The outer shield defines a body having a center portion and first and second wings extending laterally outwardly in opposite directions from the center portion. The wings of the outer shield are configured to releasably engage the respective wings of the inner shield to thereby releasably engage the outer shield with the inner shield with the center portions thereof in spaced-apart relation.

11 Claims, 10 Drawing Sheets

PROTECTIVE SHIELDS AND PROTECTIVE SHIELD ASSEMBLIES FOR INDIVIDUAL RESPIRATORS AND FACE MASKS

CROSS-REFERENCE TO RELATED APPLICATIONS

This application claims the benefit of U.S. Provisional Patent Application No. 63/010,225, filed on Apr. 15, 2020, the entire contents of which are hereby incorporated herein by reference.

BACKGROUND

Technical Field

The present disclosure relates to personal protective equipment, e.g., for healthcare workers, and, more specifically, to protective shields and protective shield assemblies for individual respirators and face masks.

Background of Related Art

Face masks and N95 respirators are examples of personal protective equipment that are used to protect the wearer from airborne particles and liquid contaminating the nose and mouth.

A face mask is a loose-fitting, disposable device that creates a physical barrier between the mouth and nose of the wearer and potential contaminants in the immediate environment. Face masks are made in different thicknesses and with different ability to protect from contact with liquids. These properties may also affect how easily the wearer can breathe through the mask and how well the face mask protects you. If worn properly, a face mask is meant to help block large-particle droplets, splashes, sprays, or splatter that may contain germs (viruses and bacteria), keeping it from reaching the mouth and nose. Face masks may also help reduce exposure of the wearer's saliva and respiratory secretions to others. While a face mask may be effective in blocking splashes and large-particle droplets, a face mask, by design, does not filter or block very small particles in the air that may be transmitted by coughs, sneezes, or certain medical procedures. Face masks also do not provide complete protection from germs and other contaminants because of the loose fit between the surface of the face mask and the wearer's face. Most face masks are not intended to be used more than once.

An N95 respirator is a respiratory protective device designed to achieve a very close facial fit and very efficient filtration of airborne particles. The "N95" designation means that when subjected to careful testing, the respirator blocks at least 95 percent of very small (0.3 micron) test particles. If properly fitted, the filtration capabilities of N95 respirators exceed those of face masks. However, even a properly fitted N95 respirator does not completely eliminate the risk of illness or death. Most if not all N95 respirators are intended for single use.

Outside of the healthcare field, face masks and N95 respirators are used in industrial jobs, e.g., construction sites, factories, etc., and other situations that that may expose the wearer to dust, fluids, and/or small particles. These non-medical face marks and N95 respirators are also typically designated as single-use devices.

SUMMARY

N95 respirators and face masks provide a level of protection for the wearer; however, as most are constructed for single-use, their effectiveness and, thus, the protection provided, may diminish when used repeatedly or for extended periods of time. When there is sufficient supply, used N95 respirators and face masks can simply be discarded in favor of new ones. However, if supply is limited, N95 respirators and face masks may need to be reused or worn for extended periods of time.

The present disclosure provides protective shields that increases the effectiveness of N95 respirators and face masks and/or helps maintain the effectiveness of reused or prolongly-used N95 respirators and face masks. The protective shields of the present disclosure are: lightweight (e.g., less than 10 grams); configured to rest with minimal contact over an N95 respirator (or face mask); provides some stand-off if a face mask is worn on top of the protective shield; allows air-flow through the N95 respirator, allowing it to perform its filtering functions with no or minimal efficiency reductions; allows heat to dissipate therethrough and away from the wearer; wraps around and under, but does not sit flush against a substantial portion of or directly attach to the N95 respirator (or face mark); may attach to the retention system of the N95 respirator (or face mark) or include its own retention system; reduces the amount or prevents particles, debris, liquids, etc. from contaminating the N95 respirator (or face mask); does not impact the seal between the N95 respirator and the wearer; and is durable and capable of being cleaned and disinfected for repeated use. The protective shield assemblies of the present disclosure may likewise include some or all of the above-noted features and benefits.

BRIEF DESCRIPTION OF THE DRAWINGS

Various aspects and features of the present disclosure are described herein with reference to the drawings wherein like reference numerals identified similar or identical elements.

DETAILED DESCRIPTION

Figure 1:
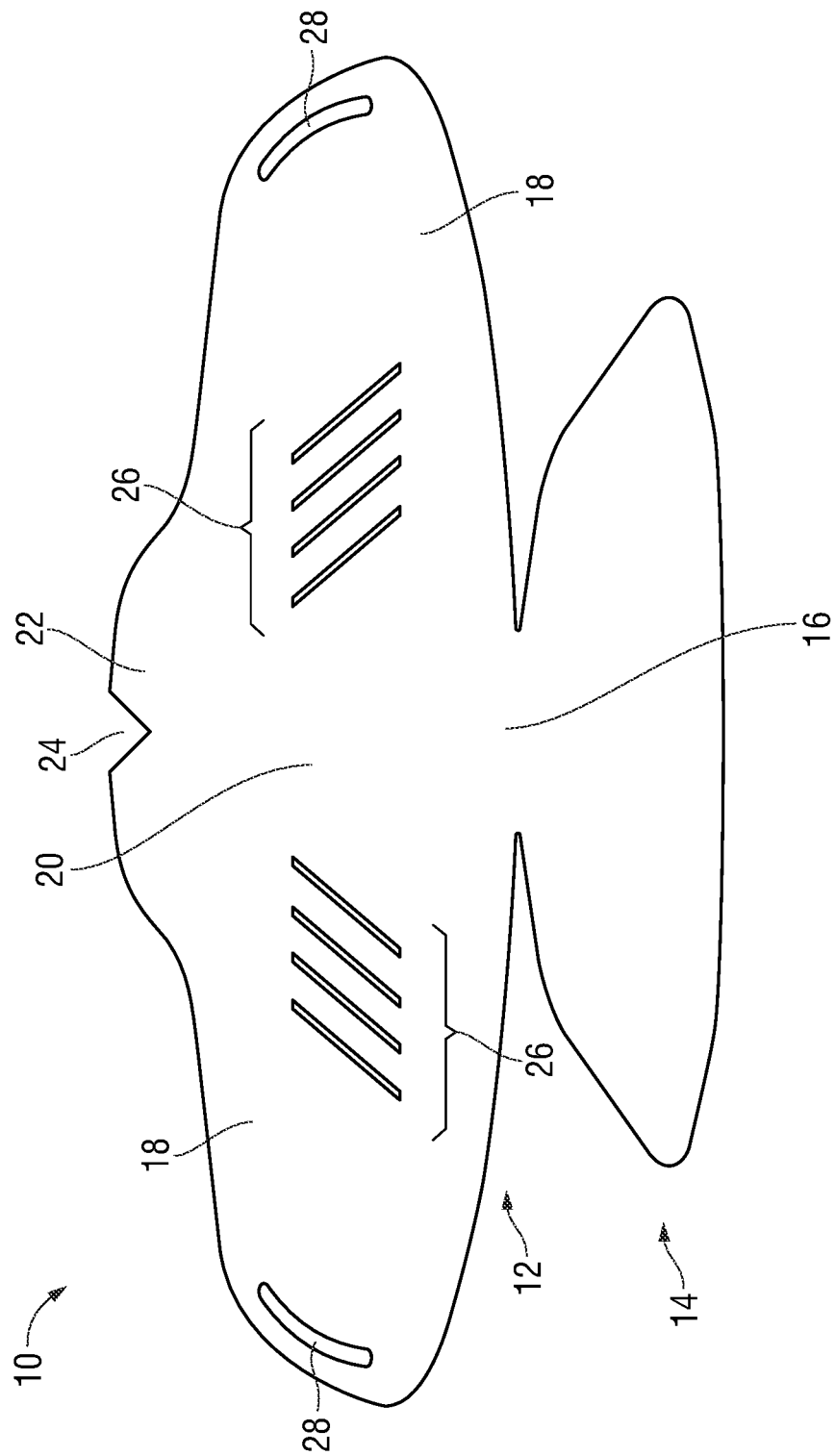
FIG. 1 is a top view of a protective shield provided in accordance with the present disclosure.
Figure 2A:
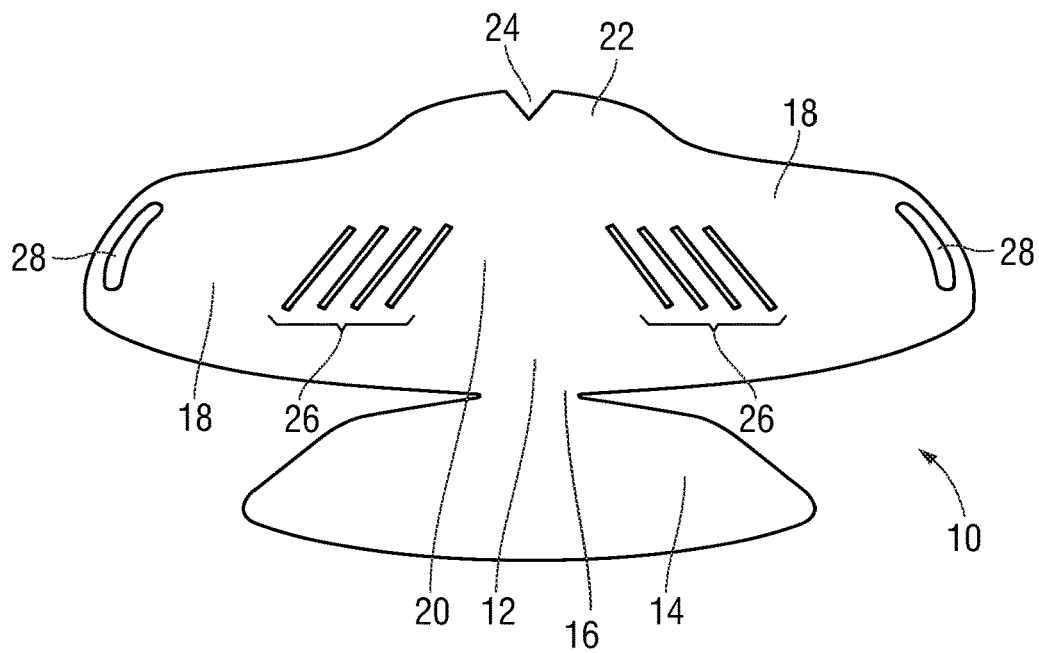
FIGS. 2A and 2B are top and bottom views, respectively, of the protective shield of FIG. 1.
Figure 2B:
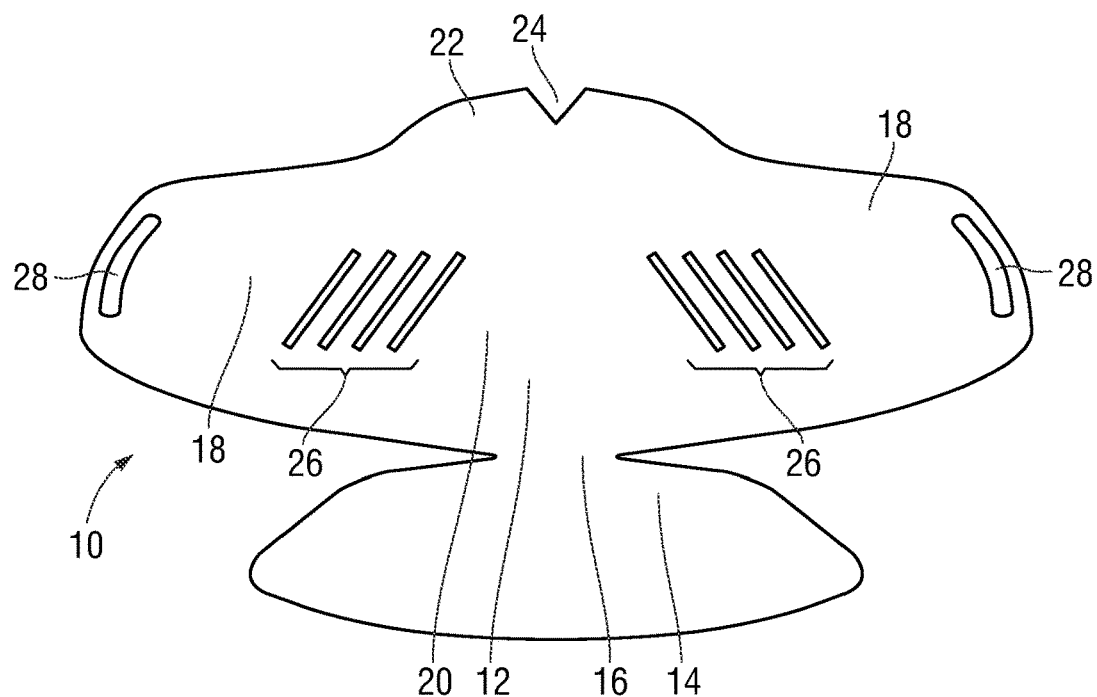

Turning to FIGS. 1-2B and 5, a protective shield provided in accordance with the present disclosure is shown generally identified by reference numeral 10. Protective shield 10 is configured for positioning about an N95 respirator to cover a substantial portion thereof, e.g., at least 70% of the outer surface area thereof, at least 80% of the outer surface area thereof, or at least at least 90% of the outer surface area thereof, without substantially contacting the N95 respirator, e.g., contacting less than 30% of the outer surface area thereof, contacting less than 20% of the outer surface area thereof, or contacting less than 10% of the outer surface area thereof, and without substantially inhibiting performance of the N95 respirator. Although detailed herein for use with an N95 respirator, protective shield 10 is also configured for use with a face mask or other suitable personal protective equipment.

Protective shield 10 is formed from any suitable biocompatible, low porosity, polymeric material including, for example, ABS, PTFE, rubber, etc. Protective shield 10 is flexible to facilitate manipulation thereof, while sufficiently rigid to maintain structural integrity when worn over an N95 respirator with minimal contact therebetween. Protective shield 10 is configured for repeated use and is readily cleanable (including disinfectant and sanitization cleaning) between each use. Protective shield 10 may be made from 3D printing, injection molding, or by any other suitable manufacturing process.

Continuing with reference to FIGS. 1-2B and 5, protective shield 10 includes a body 12 and a lower flap 14 depending from a lower end of body 12 and connected thereto via a straight of material defining a living hinge 16. Body 12 of protective shield 10 includes a pair of wings 18 extending outwardly in opposite directions from a center portion 20 of body 12. A protruding portion 22 extends from an upper end of center portion 20 of body 12 opposite and in general vertical alignment with living hinge 16. A "V"-shaped cut-out 24 is defined within protruding portion 22 to facilitate bending of protective shield 10 about a centerline of center portion 20, e.g., to enable general conformance about an N95 respirator and a wearer's nose (see FIG. 5).

Figure 3:
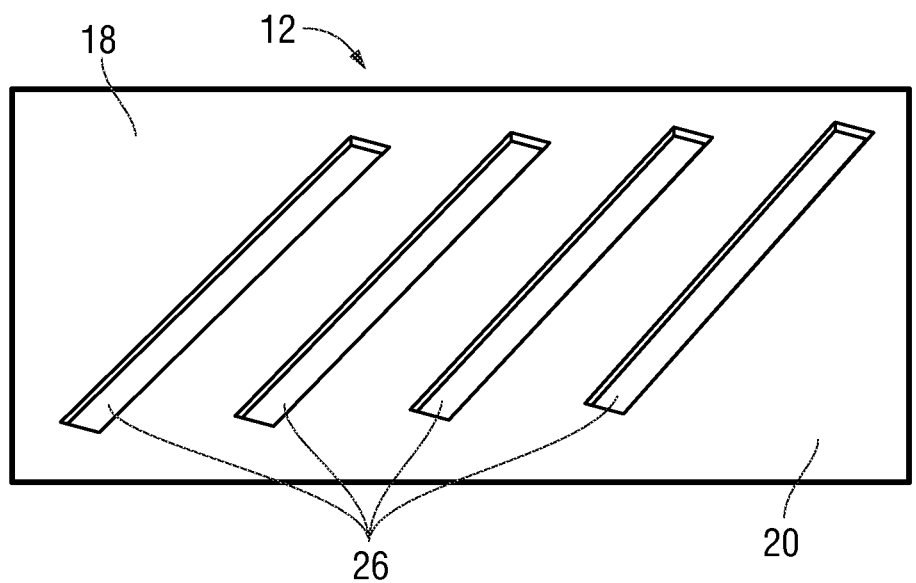
FIG. 3 is an enlarged, perspective view of another portion of the protective shield of FIG. 1 illustrating vent slots thereof.
Figure 4:
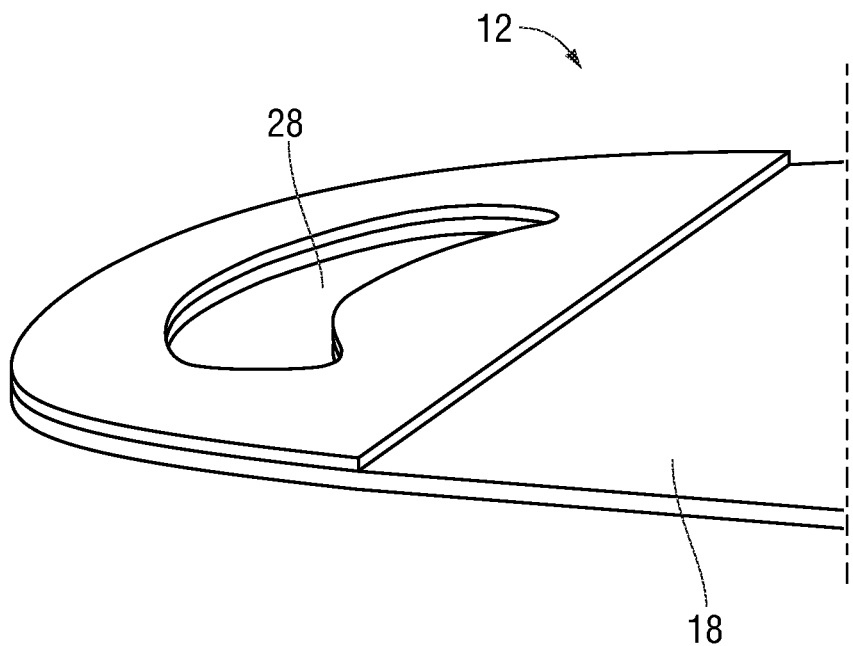
FIG. 4 is an enlarged, perspective view of a portion of the protective shield of FIG. 1, illustrating a wing end and attachment loop thereof.

Referring also to FIG. 3, a plurality of vent slots 26 are defined through body 12 on either side of the centerline of center portion 20. More specifically, the plurality of vent slot 26 on each side include equally-spaced, substantially parallel slots angling inwardly in a lower end to upper end direction. The pluralities of vent slots 26 are disposed on the outer portions of center portion 20 and/or the inner portions of wings 18 such that, in use, the vent slots 26 are disposed on opposing sides of a wearer's mouth (see FIG. 5). As an alternative to or in addition to vent slots 26, vent apertures (not explicitly shown), or other suitable vent structures are also contemplated. For example, the size, shape, number, and/or location of vent slots 26 may be modified based upon the particular use of protective shield 10, e.g., whether configured for use with an N95 respirator, face mask, or other protective device.

With reference to FIGS. 1-2B, 4, and 5, wings 18 extend outwardly from center portion 20 of body 12 and each defines an arcuate, crescent-shaped, or other suitable attachment loop 28 at the free end thereof. Attachment loops 28 enable attachment of an elastic band or other suitable tie or attachment structure for securing protective shield 10 to a user, e.g., around a user's head, around a user's ears, etc., or to an attachment structure of an N95 respirator (see FIG. 5). Outer portions of wings 18, e.g., the outer 30% thereof, the outer 40% thereof, or the outer 50% thereof, are reinforced with additional material and/or additional layers of material such that the outer portions of wings 18 define an increased thickness, e.g., an at least 50% greater thickness, an at least 75% greater thickness, or an at least 100% greater thickness, as compared to center portion 20 and the remainder of wings 18 (and, in embodiments, the remainder of protective shield 10).

Figure 5:
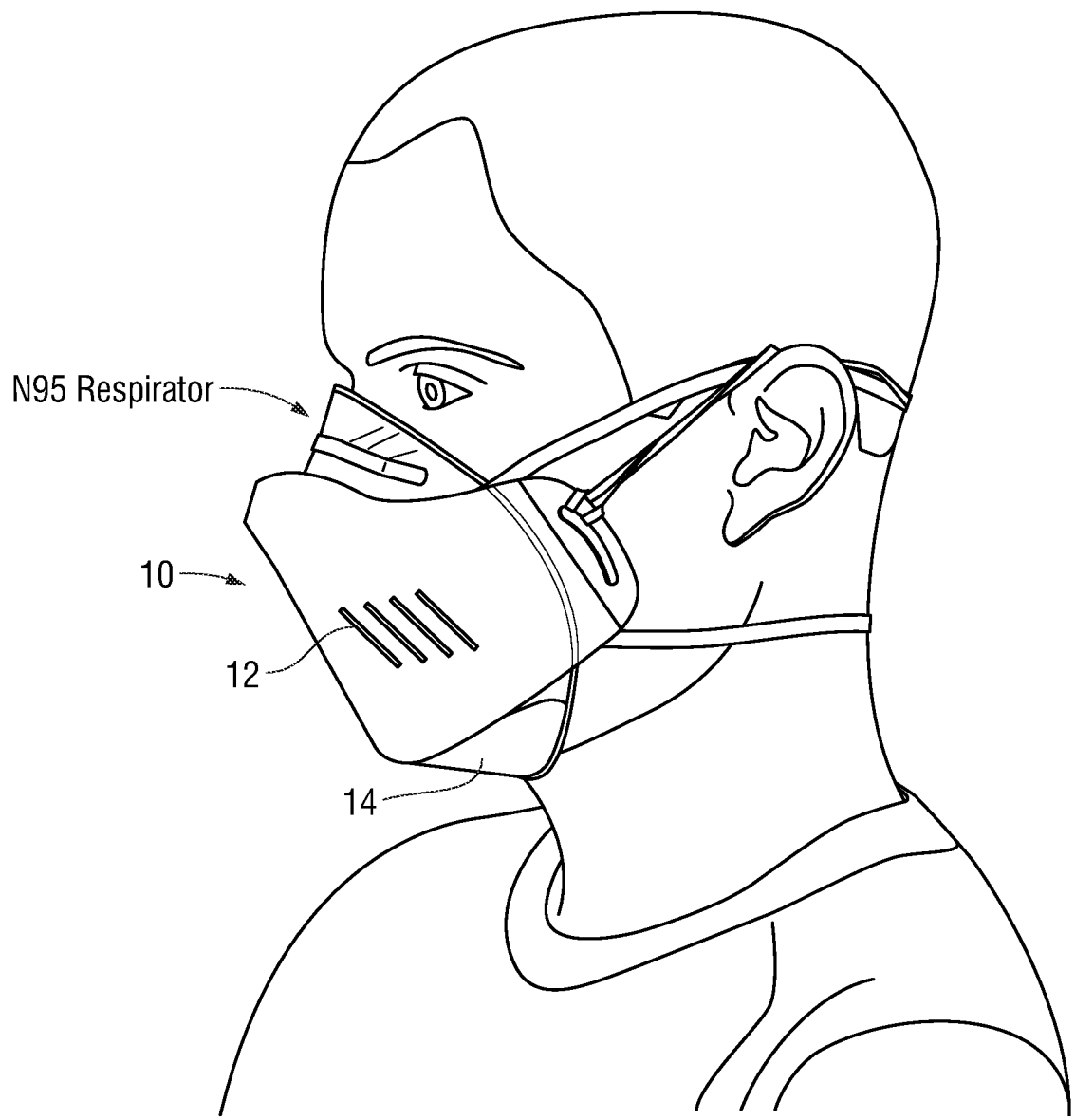
FIG. 5 is a perspective view of the protective shield of FIG. 1 disposed over an N95 respirator, worn on the face of a wearer.
Figure 6:
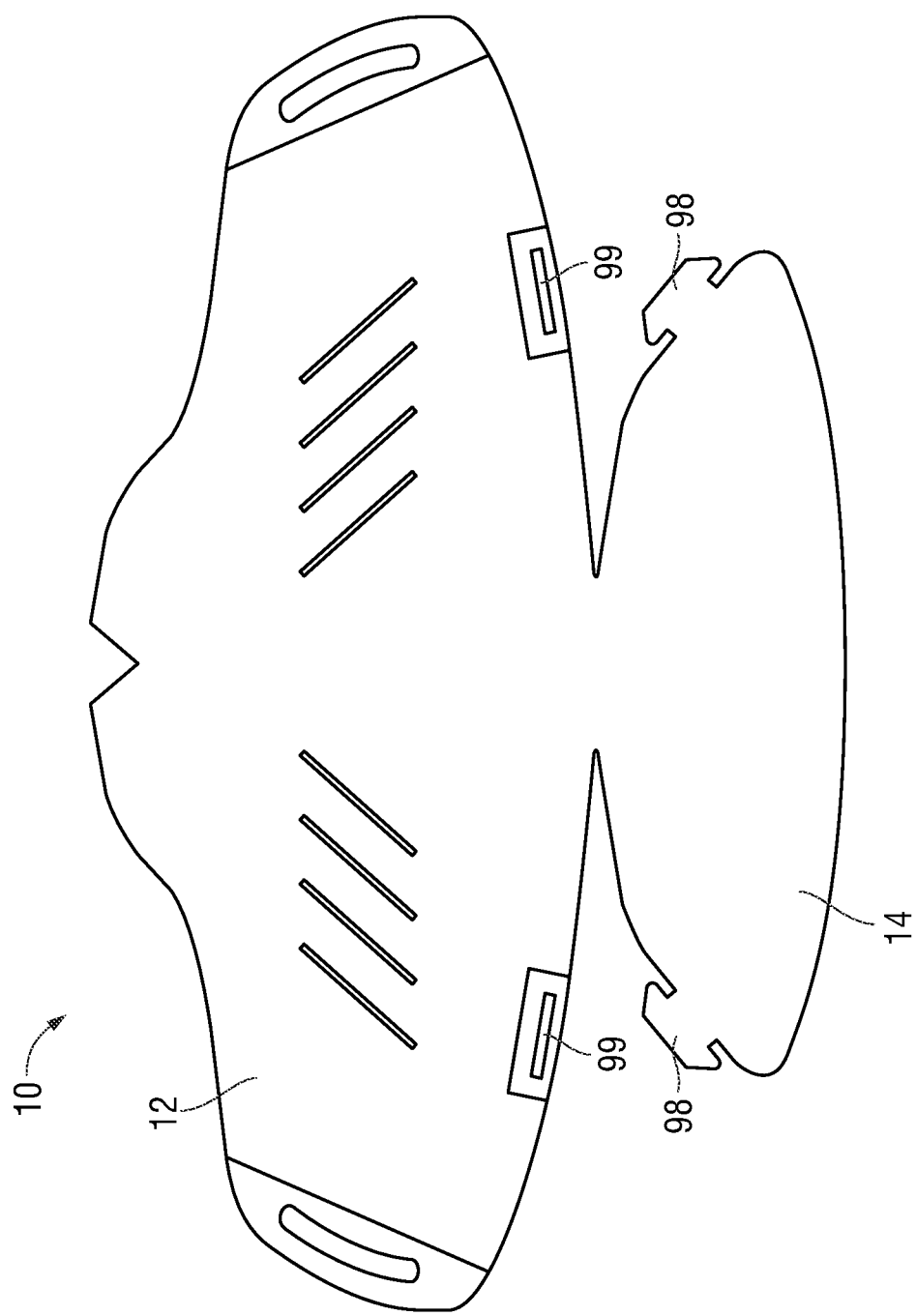
FIG. 6 is a top view of another protective shield provided in accordance with the present disclosure.

Referring again to FIGS. 1-2B and 5, lower flap 14 of protective shield defines a generally trapezoidal-shaped configuration wherein the shorter side thereof is connected to body 12 by way of living hinge 16. As a result of this configuration, lower flap 14 may be folded under a wearer's chin to protect the underside of the N95 respirator (see FIG. 5). Referring momentarily to FIG. 6, in some embodiments, lower flap 14 includes dovetails 98 configured for receipt within corresponding slots 99 defined within body 12 to secure lower flap 14 in an angled orientation relative to body 12, e.g., underneath a wearer's chin, wherein lower flap 14 is disposed at an internal angle of at most 120 degrees, at most 110 degrees, or at most 100 degrees, relative to body 12. Alternatively, as illustrated in FIG. 5, the dovetails and slots may be omitted and lower flap 14 held in the angled orientation via retention of the lower edge thereof against a lip of the N95 respirator. Further, in other configurations, lower flap 14 held in the angled orientation via retention features associated with the N95 respirator or via the stiffness of protective shield 10 and/or configuration of living hinge 16.

With reference to FIG. 5, in use, protective shield 10 serves as a first line of defense to collect or deflect particles, debris, liquids, etc. such that a significant amount of particles, debris, liquids, etc. do not reach and, thus, do not contaminate the N95 respirator (or face mask), thus facilitating reuse or extended use thereof. Further, the spacing between protective shield 10 and the N95 respirator (or face mask), due to the fact that there is minimal contact and not attachment therebetween, allows the N95 respirator (or face mask) to operate with little or no reduction in efficiency or breathing ability and also allows for heat transfer away from the wearer's face. After use, the protective shield 10 can be washed with water and soap, sanitizer, disinfectant, or other suitable solution, then rinsed and dried in preparation for reuse.

Figure 7B:
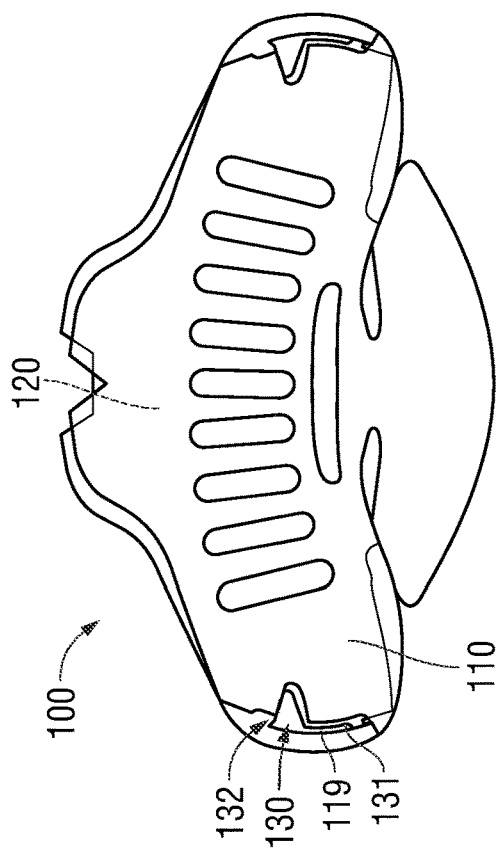
FIGS. 7A, 7B, and 7C are front, rear, and perspective views, respectively, of a protective shield assembly provided in accordance with the present disclosure.
Figure 7A:
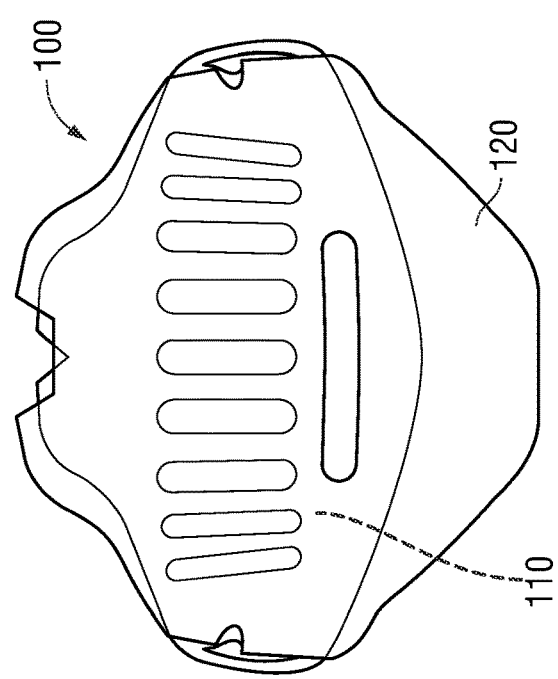
Figure 7C:
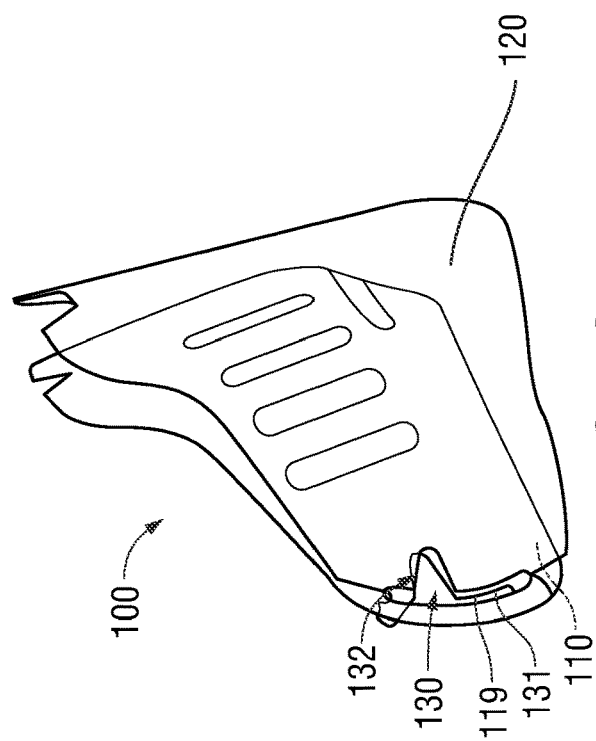

Turning to FIGS. 7A-7C, a protective shield assembly 100 provided in accordance with the present disclosure includes an inner shield component 110 and an outer shield component 120. Inner shield component 110 is configured for positioning about an N95 respirator to cover a substantial portion thereof, e.g., at least 70% of the outer surface area thereof, at least 80% of the outer surface area thereof, or at least at least 90% of the outer surface area thereof, without substantially contacting the N95 respirator, e.g., contacting less than 30% of the outer surface area thereof, contacting less than 20% of the outer surface area thereof, or contacting less than 10% of the outer surface area thereof, and without substantially inhibiting performance of the N95 respirator. Outer shield component 120 is configured for engagement with and disposition about inner shield component 110 to cover a substantial portion thereof, e.g., at least 70% of the outer surface area thereof, at least 80% of the outer surface area thereof, or at least at least 90% of the outer surface area thereof, while being spaced-apart therefrom except at the engagement ends therebetween. Inner shield component 110 may include any of the features of the protective shields 10 (FIG. 1-6) detailed above, except as explicitly contradicted below, and vice versa. Thus, similarities are not repeated below for purposes of brevity. In embodiments, inner shield component 110 is protective shield 10 (FIG. 1-6). Further, to the extent consistent, any of the features of protective shields 10 (FIG. 1-6) and/or inner shield component 110 may be utilized with outer shield component 120, and vice versa.

Figure 8:
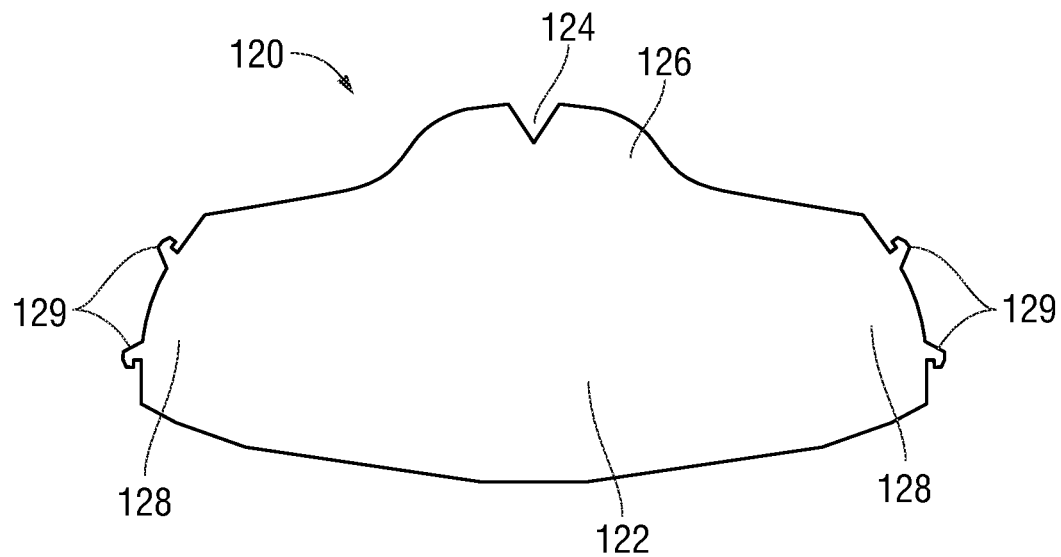
FIG. 8 is a front view of the outer shield component configured for use with the protective shield assembly of FIGS. 7A-7C.
Figure 9:
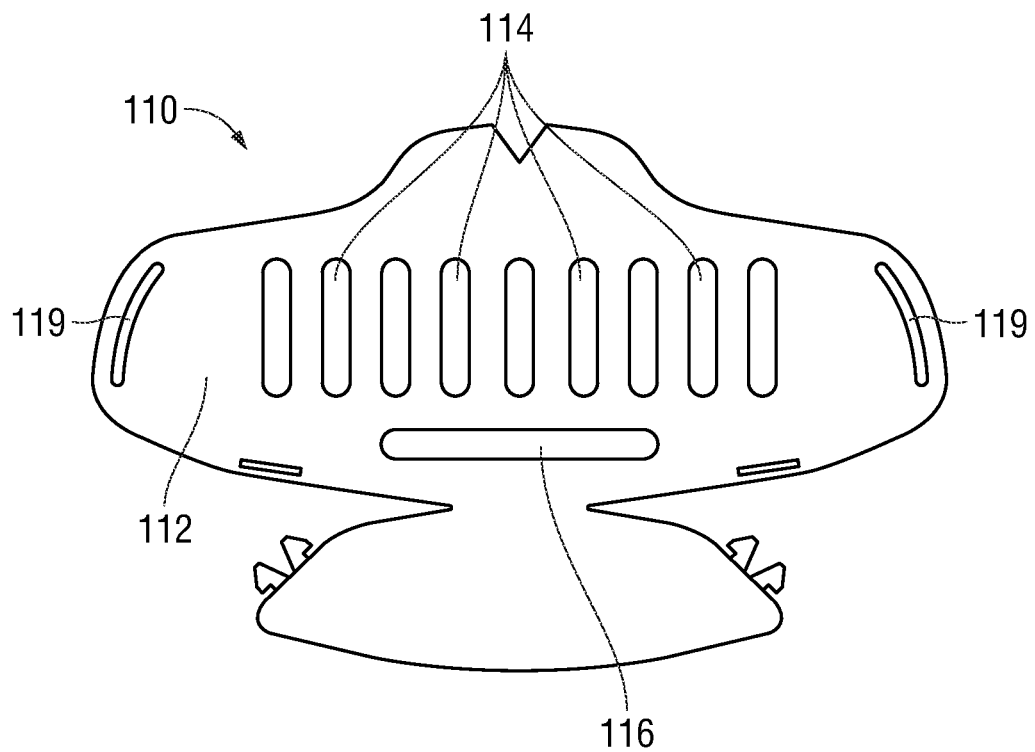
FIG. 9 is a front view of the inner shield component configured for use with the protective shield assembly of FIGS. 7A-7C.

With additional reference to FIG. 8, outer shield component 120 is formed from any suitable biocompatible, low porosity, polymeric material including, for example, ABS, polycarbonate, PTFE, rubber, etc. Outer shield component 120 is flexible to facilitate manipulation thereof, while sufficiently rigid to maintain structural integrity when engaged with inner shield component 110 in spaced-relation relative thereto. Outer shield component 120 is configured for repeated use and is readily cleanable (including disinfectant and sanitization cleaning) between each use. Outer shield component 120 may be made from 3D printing, injection molding, or by any other suitable manufacturing process. Inner shield component 110, outer shield component 120, and/or protective shield 10 (FIG. 1), in embodiments, may be formed form other suitable methods such as, for example, laser cutting, die cutting, CNC, etc. Further, rather than single-piece manufacturing, inner shield component 110, outer shield component 120, and/or protective shield 10 (FIG. 1), in embodiments, may be formed in plural smaller parts, e.g., layers, sections, etc., that are subsequently joined or otherwise secured to one another to during assembly.

Outer shield component 120 includes a body 122 including a pair of wings 128 extending outwardly in opposite directions from a center portion of body 122. Body 122 of outer shield component 120 may be continuous and uninterrupted, e.g., without any apertures or slots defined therein. A protruding portion 126 extends from an upper end of the center portion of body 122. A "V"-shaped cut-out 124 is defined within protruding portion 126 to facilitate bending of outer shield component 120 about a centerline of the center portion thereof. Wings 128 of outer shield component 120 each includes one or more engagement hooks 129 configured for receipt and engagement within attachment loops 119 of inner shield component 110 to engage outer and inner shield components 120, 110 with one another in spaced-apart relation except for the engagement between engagement hooks 129 and attachment loops 119. Engagement hooks 129, when engaged, occupy only a portion of attachment loops 119 so as to readily enable attachment of an elastic band or other suitable tie or attachment structure for securing protective shield assembly 100 to a user, e.g., around a user's head, around a user's ears, etc., or to an attachment structure of an N95 respirator.

Referring to FIGS. 7A-7C and 9, inner shield component 110, in embodiments, may be similar to protective shields 10 (FIG. 1-6) except that inner shield component 110 defines a plurality of vertically-oriented vent slots 114 that extend in equally-spaced, substantially parallel relation along a substantial portion of body 112 of inner shield component 110, e.g., along at least 40% of the width thereof, at least 50% of the width thereof, or at least 60% of the width thereof. An additional horizontal vent slot 116 may be provided, centered on body 112 of inner shield component 110 and below vertically-oriented vent slots 114, extending along at least 40% of the span of vertically-oriented vent slots 114, at least 50% of the span, or at least 60% of the span.

Figure 10:
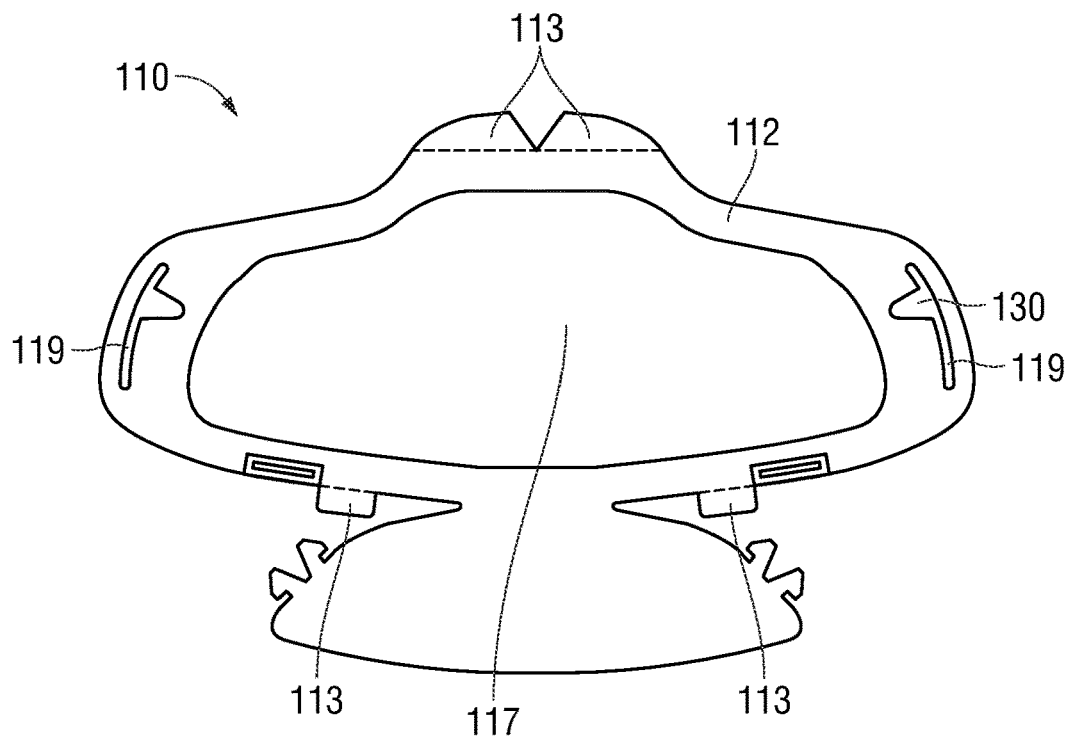
FIGS. 10 and 11 are front views of other inner shield components configured for use with the protective shield assembly of FIGS. 7A-7C.
Figure 11:
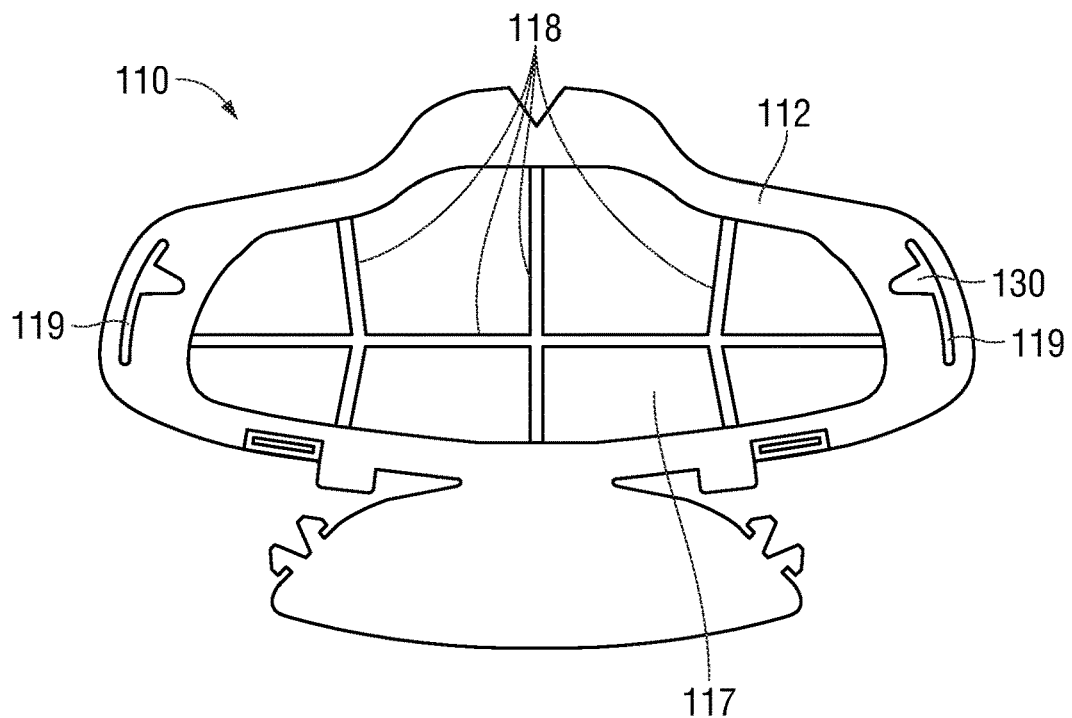

With reference to FIG. 10, another embodiment of inner shield component 110 is shown wherein, rather than providing plural vent slots, an enlarged opening 117 is defined within body 112 of inner shield component 110 leaving body 112 defining a relatively narrow-width rim of material extending about elongated opening 117. Elongated opening 117 may occupy at least 60% of the area of body 112, at least 70% of the area or at least 80% of the area. Referring also to FIG. 11, one or more support bars 118 may extend vertically, horizontally, diagonally, or in any other suitable manner across elongated opening 117 to interconnect opposing portions of body 112, thus adding structural integrity to inner shield component 110 without substantially reducing the effective size of elongated opening 117.

Generally referring to FIGS. 7A-11, the inner shield component 110 of protective shield assembly 100 provides structure and orientation on an N95 respirator and relative thereto and/or relative to a user's face. The inner shield component 110 may contact the N95 respirator without limiting function thereof due to the vents and/or opening thereof. The outer shield component 120 protects the wearer from airborne particles and liquid contaminating the nose and mouth, working together with the inner shield component 110 and N95 respirator or other face covering (if utilized).

The inner and outer shield components 110, 120 may define different dimensions relative to one another and/or an N95 respirator: for example, the inner and/or outer shield components 110, 120 may extend upwardly and/or downwardly beyond the N95 respirator to cover the entire vertical extent of a user's face (e.g., hairline-to-chin) or a greater portion thereof as compared to the N95 respirator; and/or the inner and/or outer shield components 110, 120 may extend outwardly beyond the N95 respirator on either side thereof to cover the entire lateral extend of the face of a user (e.g., ear-to-ear) or a greater portion thereof as compared to the N95 respirator. Thus, in embodiments, protective shield assembly 100, together with an N95 respirator, may provide protection similar to that of healthcare-grade face shields and N95 respirators.

In some configurations, outer shield component 120 defines a generally trapezoidal-shaped body 122 that is wider towards the bottom end thereof and narrower towards the top end thereof. This configuration ensures that outer shield component 120 does not impede the visibility of the wearer. Further, as a result of this configuration, outer shield component 120 angles outwardly at the bottom portion thereof, preventing the outer shield component 120 from obstructing the wearer when looking downward and positioned to serve as a physical barrier when the wearer is looking downward, thus blocking particles, fluids, and debris from landing directly on the underlying N95 mask, e.g., during intubation.

Figure 13:
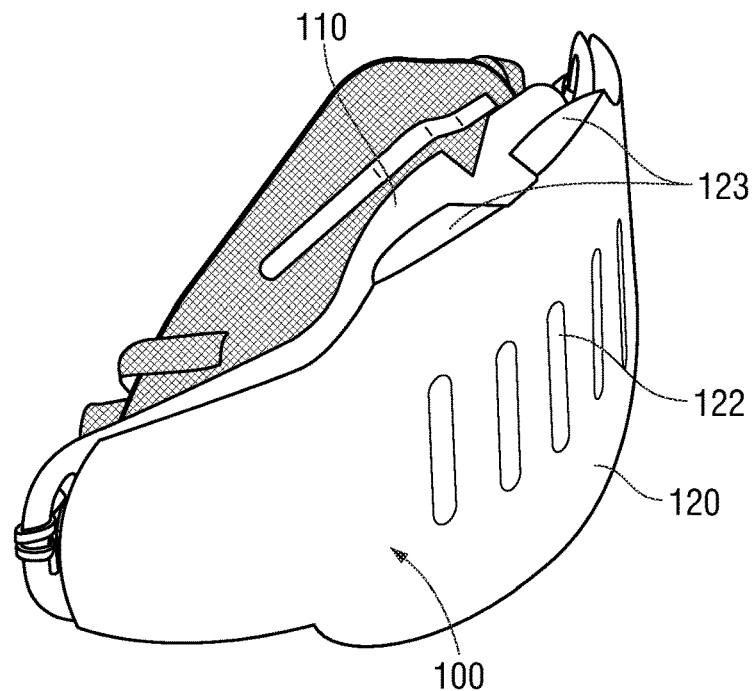
FIG. 13 is a perspective view of another protective shield assembly provided in accordance with the present disclosure and disposed on an N95 mask.

With particular reference to FIG. 10, in embodiments, body 112 of inner shield component 110 may include foldable tabs 113, e.g., at upper and/or lower portions thereof, that are configured to fold outwardly to a substantially perpendicular (within about 20 degrees thereof) orientation relative to body 112 to serve as a buffer to maintain sufficient spacing between inner shield component 110 and outer shield component 120, thus facilitating air flow. Alternatively or additionally, as shown in FIG. 13, outer shield component 120 may include foldable tabs 123, e.g., at upper portions thereof, lower portions thereof, and/or extending into enlarged opening 117 (see FIG. 14), that are configured to fold inwardly to a substantially perpendicular (within about 20 degrees thereof) orientation relative to body 122 to serve as a buffer to maintain sufficient spacing between inner shield component 110 and outer shield component 120, thus facilitating air flow.

Figure 12:
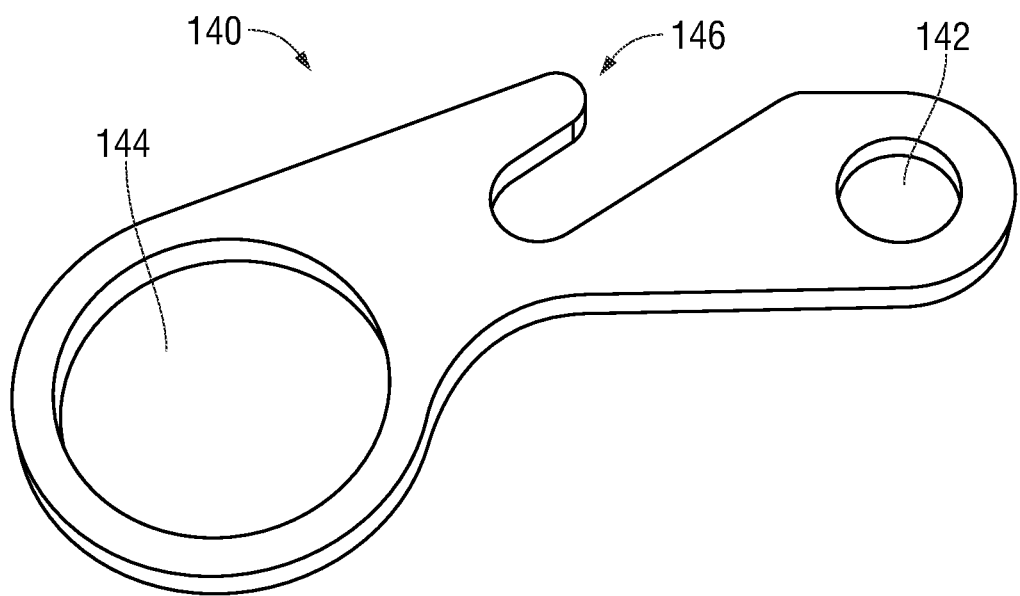
FIG. 12 is a perspective view of a quick-release clip configured for use with any of the protective shields or protective shield assemblies of the present disclosure.

Referring to FIG. 12, in conjunction with FIGS. 7A-7C, and initially to FIGS. 7A-7C, in embodiments, one or both of the inner and outer shield components 110, 120 defines a "V"-shaped recess extension 130 communicating with and enlarging a portion of the attachment loop 119, 131, respectively, thereof. Where both are provided, the "V"-shaped recess extensions 130 align with one another when outer shield component 120 is engaged about inner shield component 110, thus establishing a pair of clearance channels 132 extending through protective shield assembly 100 on opposing sides thereof. In some embodiments, a "V"-shaped recess extension 130 is provided on only one side and, thus, a clearance channel 132 is formed on only one side of the protective shield assembly 100.

With additional reference to FIG. 12, a quick-release clip 140 configured for releasably engagement within one of the clearance channels 132 is shown generally including first and second apertures 142, 144, and a lock saddle 146. First aperture 142 is configured to enable attachment of an elastic band or other suitable tie or attachment structure for securing protective shield assembly 100 to a user, e.g., around a user's head, around a user's ears, etc., or to an attachment structure of an N95 respirator. Second aperture 144 is configured as a finger hole to enable inserting of a finger of a user to facilitate grasping and manipulating quick-release clip 140. Lock saddle 146 is generally disposed between first and second apertures 142, 144, respectively, in a width-wise direction and is configured for positioning within the clearance channel 132 to engage adjacent portions of inner and outer shield components 110, 120. In this manner, quick-release clip 140 is retained in engagement with inner and outer shield components 110, 120, thus engaging the elastic band or other tie or attachment structure thereto. In order to release and disengage the clip 140 and, thus, the elastic band or other tie or attachment structure, the user grasps the finger aperture 144 and rotates the clip 140, thereby dislodging the lock saddle 146 from the inner and outer shield components 110, 120. Quick-release clips 140 may be provided on one or both sides of protective shield assembly 100. Further, in some embodiments, "V"-shaped recesses 130 are omitted and lock saddle 146 is configured for receipt within attachment loop 119, 131, respectively, to engage portions of inner and outer shield components 110, 120 adjacent attachment loop 119, 131, respectively, thereof. In any of the above configurations, tension provided by the elastic band or other tie or attachment structure enables secure retention of the quick-release clip(s) 140 with protective shield assembly 100 while readily enabling release thereof.

Figure 14:
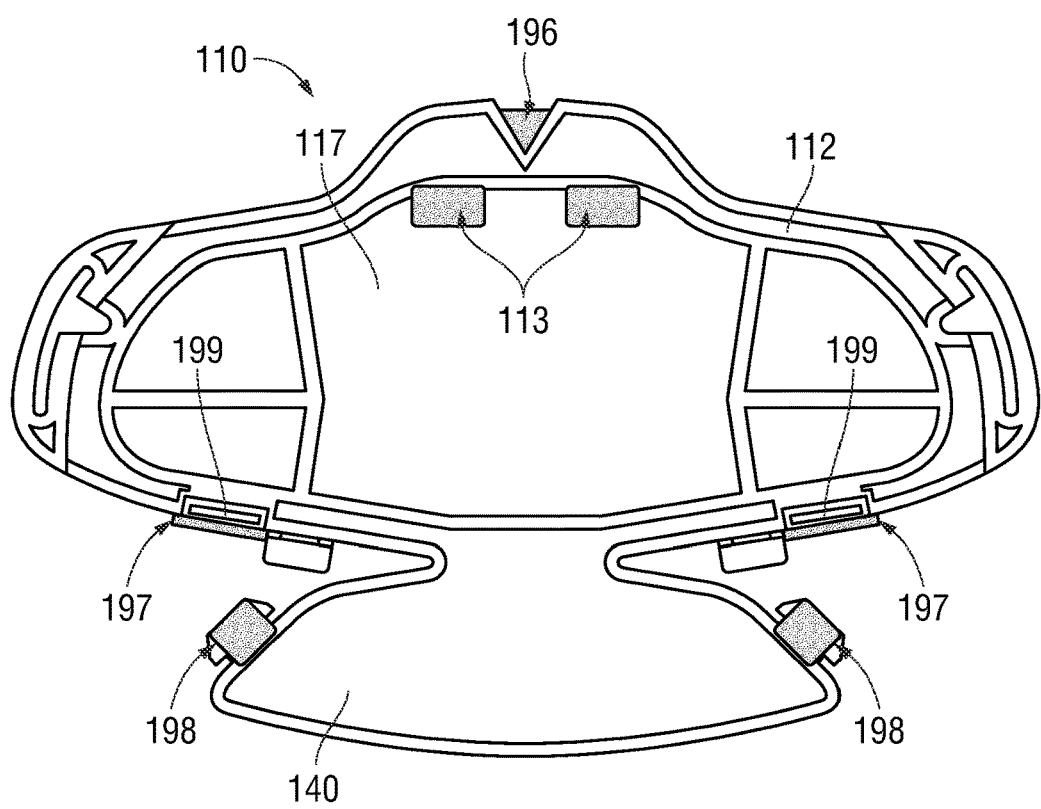
FIG. 14 is a front view of another inner shield component configured for use with a protective shield assembly.

FIG. 14 illustrates inner shield component 110 including additional features (which may additionally or alternatively be provided with outer shield component 120 (FIG. 8) and/or protective shield 10 (FIG. 1), where applicable) such as, for example: trapezoidal tabs 198 extending from lower flap 140 for receipt within corresponding slots 199 defined within body 122 to secure lower flap 140 in an angled orientation relative to body 122; reinforcement 197, e.g., increased thickness, additional layers, etc. surrounding at least a portion of slots 199 to inhibit tearing; and an at least partially filled-in V-shaped cut-out 96.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A protective shield assembly configured to be disposed over an N95 respirator worn by a user, the protective shield assembly comprising:
   an integral inner shield of flexible, biocompatible, polymeric material, the inner shield defining a body, a flap, and a living hinge connecting the body and the flap with one another, wherein the flap is configured to fold relative to the body about the living hinge such that the flap is foldable under a chin of the user while the body extends across a face of the user, wherein the body includes a center portion defining at least one opening therethrough and from which the flap depends, the body further including first and second wings extending laterally outwardly in opposite directions from the center portion; and
   an integral outer shield of flexible, biocompatible, polymeric material, the outer shield defining a body having a center portion and first and second wings extending laterally outwardly in opposite directions from the center portion, wherein the center portion is continuous and uninterrupted,
   wherein the first and second wings of the outer shield are configured to releasably engage the first and second wings of the inner shield, respectively, to thereby releasably engage the outer shield with the inner shield such that:
      the center portions of the inner shield and the outer shield are disposed in spaced-apart relation relative to one another,
      the continuous and uninterrupted center portion of the outer shield covers the at least one opening of the center portion of the inner shield, and
      the inner and outer shields are flexed from substantial planar at-rest configurations to curved configurations.

2. The protective shield assembly according to claim 1, wherein the first and second wings of the inner shield define first and second attachment loops, respectively, and wherein the first and second wings of the outer shield define first and second attachment hooks, respectively, the first and second attachment hooks configured to releasably engage the first and second attachment loops, respectively, to thereby releasably engage the first and second wings of the outer shield and the first and second wings of the inner shield, respectively, with one another.

3. The protective shield assembly according to claim 1, wherein the at least one opening defines a majority of an area of the body of the inner shield.

4. The protective shield assembly according to claim 1, wherein the inner shield includes tabs extending therefrom in substantially perpendicular orientation relative to the body of the inner shield, the tabs serving as a buffer to maintain spacing between the center portions of the inner shield and the outer shield.

5. The protective shield assembly according to claim 4, wherein the tabs are formed monolithically with the body of the inner shield and are folded relative to the body of the inner shield to extend in substantially perpendicular orientation relative thereto.

6. The protective shield assembly according to claim 1, wherein the inner shield and the outer shield each include a protruding portion extending vertically from an upper end of the center portion of the body thereof, each protruding portion defining a V-shaped cut-out to facilitate bending of the respective bodies to enable conformance of the respective bodies about the N95 respirator and a nose of the user when the protective shield assembly is disposed over the N95 respirator worn by the user.

7. The protective shield assembly according to claim 1, wherein the flap of the inner shield, in a folded position relative to the body of the inner shield, is configured to releasably engage the body of the inner shield at first and second positions spaced-apart from and disposed on opposite sides of the living hinge.

8. The protective shield assembly according to claim 7, wherein the flap of the inner shield is configured to releasably engage the body of the inner shield in the folded position to define an internal angle of at most 120 degrees between the flap and the body of the inner shield.

9. The protective shield assembly according to claim 1, wherein both the inner shield and the outer shield are formed from the same material.

10. The protective shield assembly according to claim 1, wherein both the inner shield and the outer shield are 3D printed.

11. The protective shield assembly according to claim 1, wherein at least a portion of the inner shield is reinforced with additional material.

\* \* \* \* \*